United States Patent [19]
Wright

[11] Patent Number: 5,860,069
[45] Date of Patent: Jan. 12, 1999

[54] METHOD OF EFFICIENT COLLECTION OF SQL PERFORMANCE MEASURES

[75] Inventor: John Harvey Wright, Richmond, Tex.

[73] Assignee: BMC Software, Inc., Houston, Tex.

[21] Appl. No.: 835,953

[22] Filed: Apr. 11, 1997

[51] Int. Cl.⁶ .................................................. G06F 17/30
[52] U.S. Cl. ........................... 707/4; 707/2; 707/3; 707/5
[58] Field of Search ................................ 707/2, 4, 3, 5

[56] References Cited

U.S. PATENT DOCUMENTS

| | | | |
|---|---|---|---|
| 5,555,367 | 9/1996 | Premerlani et al. ..................... | 395/161 |
| 5,664,172 | 9/1997 | Antoshenkov .............................. | 707/4 |
| 5,724,569 | 3/1998 | Andres ........................................ | 707/2 |
| 5,742,806 | 4/1998 | Reiner et al. ............................... | 707/3 |
| 5,758,357 | 5/1998 | Barry et al. .............................. | 707/202 |
| 5,761,654 | 6/1998 | Tow ........................................... | 707/2 |
| 5,761,657 | 6/1998 | Hoang ........................................ | 707/4 |
| 5,765,146 | 6/1998 | Wolf et al. ................................. | 707/2 |
| 5,765,147 | 6/1998 | Mattos et al. .............................. | 707/4 |

OTHER PUBLICATIONS

IBM Database 2 performance: Design, Implementation, and tuning, Cheng et al., IBM Systems Journal, vol. 23, No. 2, Aug. 1984, pp. 189–210.

Fast Algorithms for Universal Quantification in Large Database, Graefe et al., ACM Transactions on Database Systems, vol. 20, No. 2, Jun. 1995, pp. 187–236.

A Performance Analysis of Relational And Hierarchical Database Packages based on Query Response, Warren G. Weis, Computing vol. 3, No. 4, pp. 18–26, Sep. 1995.

Detector User Guide, Detector V2.1 P512AD Addendum, Platinum Technology, Feb. 1997.

SmartMode overview http://www.ibi.com/products/smartmode/overview.html, Nov. 1994.

Statement of inventor regarding upatented prior art, No Date.

*Primary Examiner*—Thomas G. Black
*Assistant Examiner*—Shahid Alam
*Attorney, Agent, or Firm*—Tim Headley; Haynes and Boone, L.L.P.

[57] ABSTRACT

A computerized method of intercepting SQL processing within a relational database. The relational database includes a relational database management program having SQL processing logic. The method includes the steps of: (a) enabling an SQL intercept code by connecting directly into the SQL processing logic of the relational database management program; (b) using the SQL intercept code to intercept an SQL statement made to the relational database; (c) using the SQL intercept code to collect a first set of real-time SQL performance information located in selected structures of the relational database; (d) returning control to the SQL processing logic until the relational database management program has processed the SQL statement to completion; (e) using the SQL intercept code to collect a second set of real-time SQL performance information located in the structures; (f) comparing the first set with the second set in order to measure the performance of the SQL statement; and (g) returning control to the relational database management program.

14 Claims, 5 Drawing Sheets

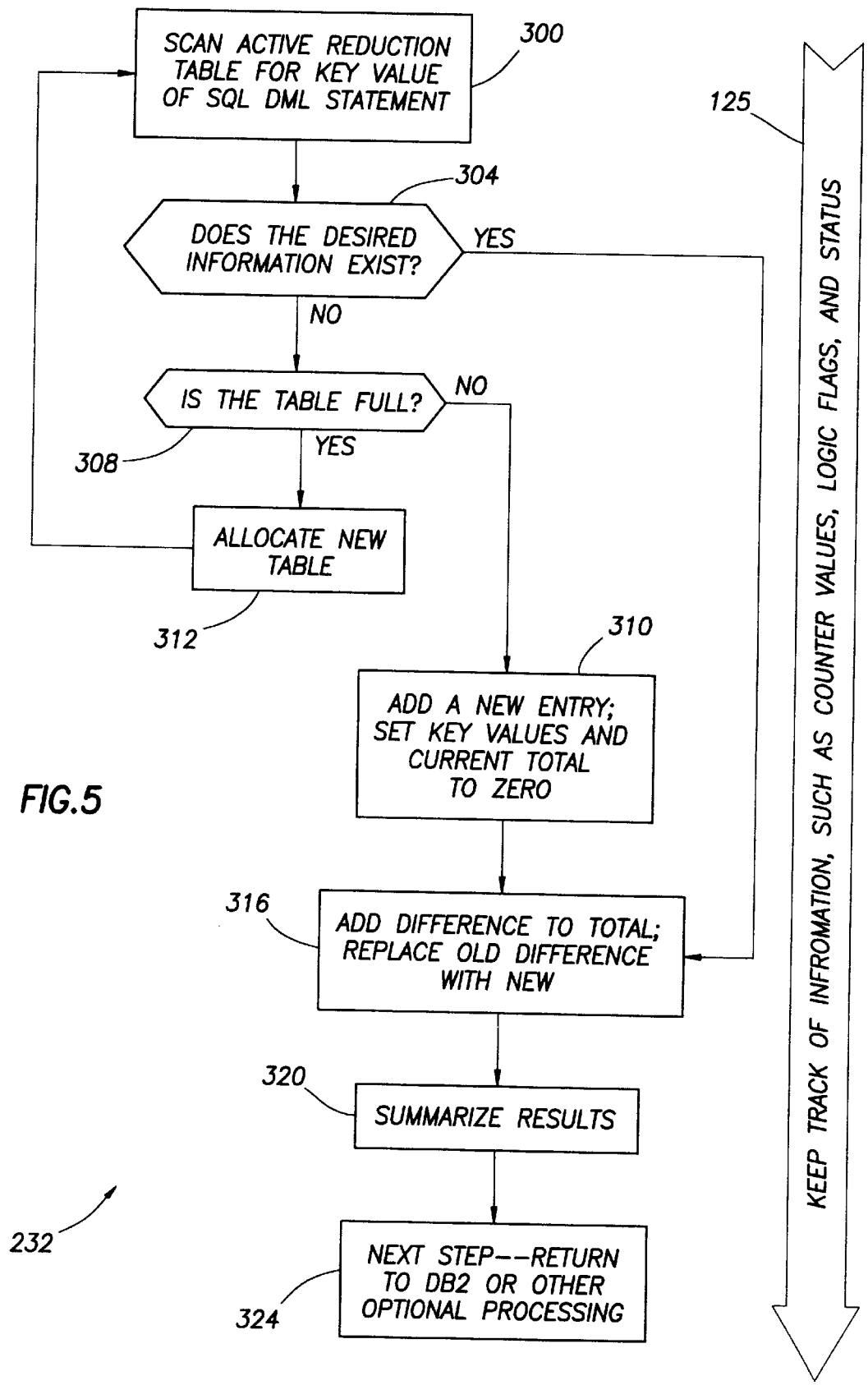

METHOD OF EFFICIENT COLLECTION OF SQL PERFORMANCE MEASURES

BACKGROUND OF THE INVENTION

This invention relates to acquisition of performance and resource consumption data from a relational database, and, more particularly, to a method of retrieving this data, specific to Structured Query Language (SQL) queries, from the DB2 database licensed by International Business Machines Corp. (IBM). The American National Standards Institute (ANSI) and the International Standards Organization (ISO) published SQL standards in 1986 and 1987, respectively. ANSI and ISO jointly worked on an extension to the standards, variously called SQL2, SQL-92, or SQL/92. Another extension to the standards, SQL3, is in progress, to enhance relational capabilities, and add support for object-oriented features.

A query to a relational database is a request for information from the database based on specific conditions. For example, a query could be a request for a list of all customers in a customer table who live in Texas. In order to reduce response time to SQL queries which are directed to a relational database, a user, such as a systems programer, an applications programer, or a database administrator, improves his hardware, by buying a faster CPU or adding more space for data storage, or both, or improving his response time by the buffering of data objects.

Alternatively, the user optimizes the SQL statements. The user optimizes SQL statements, also known as "tuning", through monitoring and measuring SQL performance. He measures performance by determining what amount of available system resources an individual SQL statement is using, and the overall workload impact of any specific SQL statement. The user makes changes based on these observations.

However, due to the complexity of the relationships among the data, the process of tuning SQL statements is complex, time consuming, and demands considerable system resources. For example, DB2 for Multiple Virtual System (MVS) offers a detailed SQL trace capability. However, this SQL trace can add anywhere from 50% to 100% overhead to DB2. Because of this large overhead, the SQL trace is generally not continually used. Other optimization programs, such as thread or transaction level traces, provide measures that identify only the most resource-demanding groups of SQL statements. These traces are not capable of identifying the specific SQL statements in need of tuning. Still other optimization routines measure performance across the entire SQL process, including DB2's SQL Processing Prologue and the Epilogue. These routines give an aggregate measure called "Class 2" time, which is of limited value in determining how a specific SQL statement performed.

SQL Data Manipulation Language (DML) statements represent the actual low-level SQL queries which either select, update, insert, or delete data from DB2. Optimizing these on a statement by statement basis is the most effective way to minimize resource consumption and maximize performance.

What the industry needs is a method of reducing the response time to SQL queries directed to a relational database, without having to increase the hardware requirements, and without having to provide more memory caches for data objects. More specifically, what the industry needs is a program that will directly monitor SQL DML performance and resource consumption on an ongoing basis, without the monitoring program consuming 50% or more of system resources.

SUMMARY OF THE INVENTION

A computer-readable medium is encoded with a method of intercepting SQL processing within a relational database. The relational database includes a relational database management program having SQL processing logic. The method includes the steps of: (a) enabling an SQL intercept code by connecting directly into the SQL processing logic of the relational database management program; (b) using the SQL intercept code to intercept an SQL statement made to the relational database; (c) using the SQL intercept code to collect a first set of real-time SQL performance information located in selected control blocks of the relational database; (d) returning control to the SQL processing logic until the relational database management program has processed the SQL statement to completion; (e) using the SQL intercept code to collect a second set of real-time SQL performance information located in the control blocks; (f) comparing the first set with the second set in order to measure the performance of the SQL statement; and (g) returning control to the relational database management program.

In another feature, the relational database management program is an IBM Database 2 program (DB2). DB2 includes an SQL processing module, an SQL processing routine having an SQL processing entry point, and an SQL Data Manipulation Language processing routine having an SQL Data Manipulation Language processing entry point. DB2 further includes a Master Entry Point List. When operating in DB2, the step of enabling comprises the substeps of: (a) loading a substitute SQL processing routine to the medium; (b) scanning the relational database management program for the address of the SQL Processing Entry Point and the address of the SQL Data Manipulation Language processing entry point; (c) scanning a portion of the medium, which the SQL processing module occupies, for the address of the SQL Data Manipulation Language processing entry point; and (d) replacing the address of the SQL Data Manipulation Language processing entry point with an entry point address of a substitute SQL processing entry point.

In another feature, the step of enabling comprises the substeps of (a) loading a substitute SQL processing routine to the medium; (b) locating the Master Entry Point List; (c) scanning the Master Entry Point List for the address of the SQL processing routine entry point; (d) scanning the Master Entry Point List for the address of the SQL DML processing entry point; (e) scanning a portion of the medium occupied by the SQL DML processing routine and locating each occurrence of the entry point address of the SQL DML processing module; and (f) for each location matched in step (e), replacing the address of the SQL Data Manipulation Language processing point with an entry point address of the substitute SQL processing routine.

In another feature, the invention provides an efficient means to gather performance data concerning the processing and resource consumption of SQL DML statements.

In another feature, the invention identifies specific SQL statements consuming the most resources, thus enabling system administrators to optimize these SQL statements.

BRIEF DESCRIPTION OF THE DRAWINGS

FIG. 5 is a flow chart of the summarization step of the preferred embodiment.

DETAILED DESCRIPTION OF THE PREFERRED EMBODIMENT

The method of the present invention is used with IBM Database 2, having an MVS/ESA operating system, relational database (DB2), but it could be used with any relational database. The program of the preferred embodiment (named "APPTUNE"™ and available from BMC Software Inc. of Houston, Tex.) is a method of efficient collection of SQL processing performance measures.

Figure 1A:
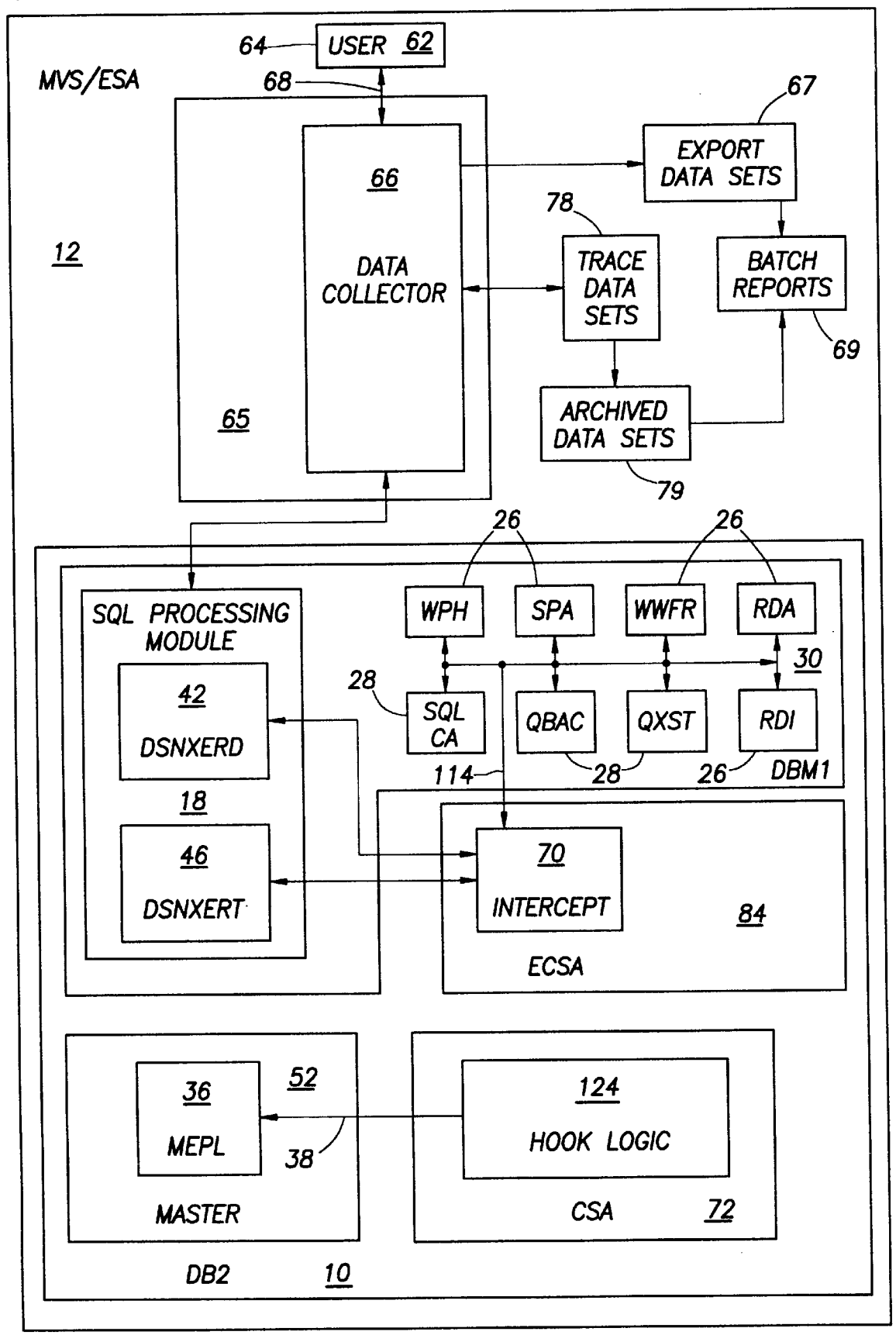
FIG. 1a is a block diagram showing the relationship between the program of the preferred embodiment and DB2.

In the preferred embodiment, as shown in FIG. 1a the APPTUNE program executes on an IBM MVS mainframe computer system not shown in the figures. The system uses an MVS/ESA operating system 12. DB2 10 runs on MVS 12.

DB2 10 includes a control block named the Master Entry Point List (MEPL) 36, which is located in the Master address space 52 of DB2, and an SQL processing module 18, control blocks 26, and corresponding data structures (DSECTS) 28, which are located in an DB2 address space called DBM1 30. The SQL processing module 18 includes an SQL processing routine (DSNXERD) 42, and an SQL Data Manipulation Language (DML) processing routine (DSNXERT) 46.

The DSNXERD 42 contains the main SQL processing logic. The SQL processing logic retrieves and organizes data which DB2 10 needs to satisfy the user's request. The user 62 is usually either a systems programer, business analyst, an applications programer, or a database administrator. The user 62 requests data from DB2 10 by means of an SQL request 56.

The user 62 interfaces with the APPTUNE program (not shown) via a terminal 64. The APPTUNE program has the following components: a Data Collector 66, a substitute SQL DML processing routine (ASQXISQL) or Intercept 70, and a user interface (not shown).

The user 62 interfaces with the Data Collector 66 as an arrow 68 indicates. The Data Collector 66 is located in an address space called the Data Collector address space 65. The Data Collector 66 has administrative functions, including (1) storing data specific to all Data Collector users'requirements, (2) retrieving the data either from control blocks 26, data structures 28, or from trace data sets 78, to satisfy the requirements of the user 62, and (3) processing various categories of commands on behalf of the user 62. The data is often externalized to a Direct Access Storage Device (DASD) in the form of one or more trace data sets 78 for historical reporting. The user 62 may also retrieve the data from the trace data sets 78. The Data Collector 66 is also responsible for reading and writing to disk, and for performing tasks which need to occur on a timed basis. The Data Collector 66 can export all data to export data sets 67 for use in batch reports 69. The Data Collector 66 also stores trace data sets 78 for archiving in archive data sets 79. The data in the archived data sets 79 is available for batch reports 69. In sum, the Data Collector 66 is responsible for getting the data together to service the data requests of the user 62.

Figure 2:
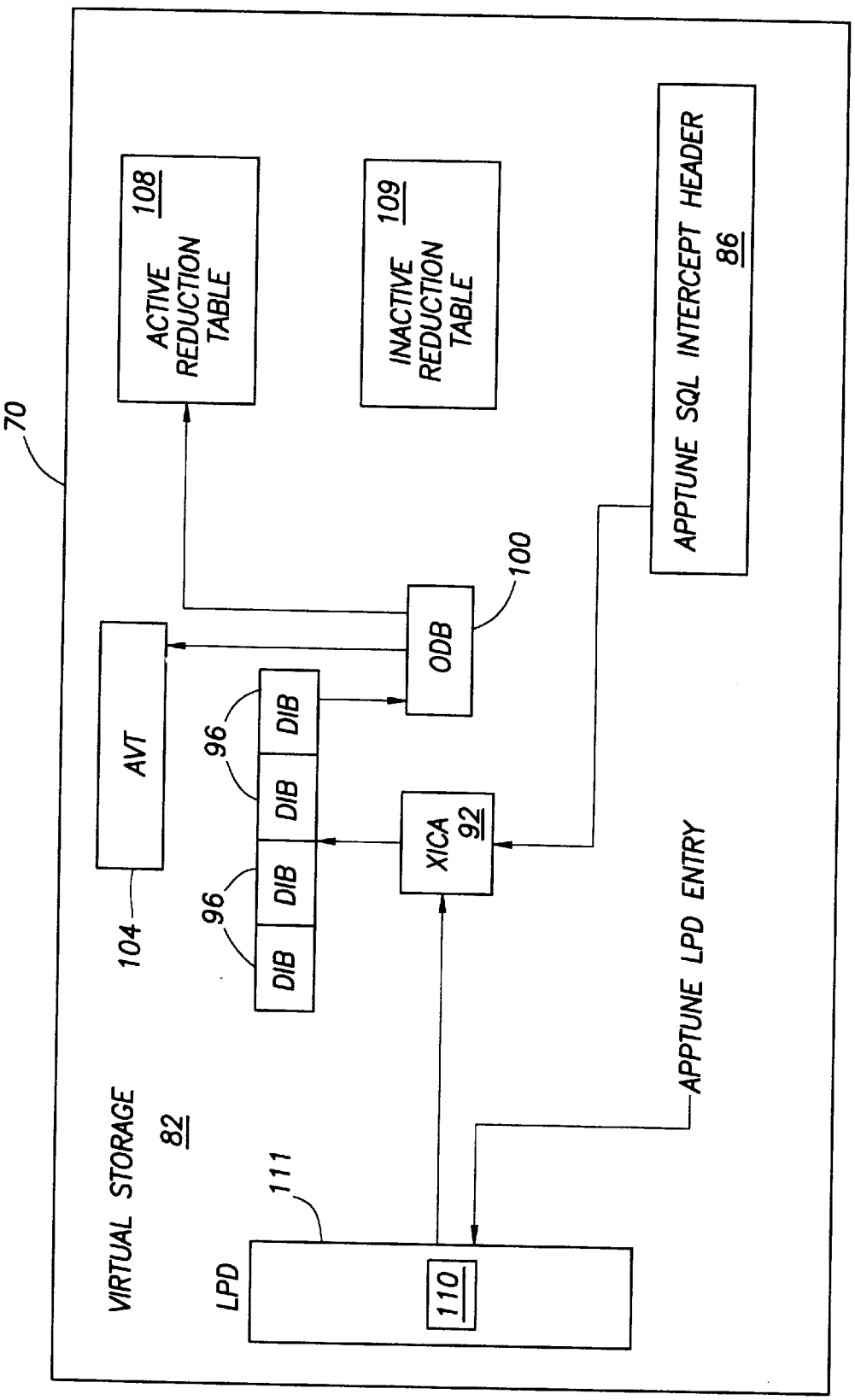
FIG. 2 is a block diagram of the Intercept of the preferred embodiment.

Now referring to FIG. 2, the Intercept 70 is stored in virtual storage 82, in a common memory area called ECSA 84 (shown in FIG. 1a), and is made up of an APPTUNE SQL Intercept Header 86, an APPTUNE Intercept control area (XICA) 92, a chain of DB2 Information Blocks (DIBs) 96, an Object Data Block (ODB) 100, an APPTUNE Vector Table 104, an active reduction table 108, an inactive reduction table 109, and an APPTUNE Link Pack Directory (LPD) entry 110 in a LPD 111.

The Intercept Header 86 points to the XICA 92. The XICA 92 performs the function of establishing primary addressability to the DIBs 96. A single XICA 92 is used per version and maintenance level of the APPTUNE program on a MVS image (an initial program load or "IPL" session).

The DIBs 96 store information particular to a DB2 10, such as where the entry point is for the DSNXERT 46. The address of the first executable instruction of a routine is called the entry point of that routine. In order to execute a routine, a specific, addressable entry point is required. Each DIB 96 points to an ODB 100. The purpose of the ODB 100 is to maintain information particular to a specific Data Collector 66/DB2 10 combination, such as the location of the reduction tables (e.g., 108 and 109), which reduction table is currently active, how many entries are in the active reduction table 108, as well as other information.

The active reduction table 108 is an area of storage in which the APPTUNE program collects and stores metrics. Metrics are data which a routine can turn into information. The APPTUNE program may externalize reduction tables by writing the reduction tables to DASD at timed intervals, on user demand, or whenever the reduction tables become full. If a reduction table is being unloaded, then the APPTUNE program will allocate and use an additional table. The APPTUNE program uses the reduction tables in a ring fashion whenever the data requires an unload, in order to avoid data loss.

The ODB 100 points to an APPTUNE Vector Table (AVT) 104 and serves to anchor the active reduction table 108. Only one vector table exists per Data Collector 66 (shown in FIG. 1a). This is significant because it permits calling certain helper subroutines.

The AVT 104 contains various parameters and subroutine entry points which the Intercept 70 uses for the purpose of intercepting and obtaining metrics.

The LPD 111 is an MVS control block chain whose function is to maintain pointers to routines across a cycle of MVS or MVS warm starts (starts without a microcode load). The APPTUNE program adds the APPTUNE LPD entry 110 to this chain. The APPTUNE LPD entry 110 points to the XICA 92.

Referring again to FIG. 1a prior to operation, a system administrator or technician must install and enable the APPTUNE program. Installation is the process in which the technician loads all of the components of the Intercept 70 to computer memory and makes it ready for use. Installation involves the steps of loading and relocating the code of the Intercept 70. A Hook Logic code (ASQWHDB) 124, a subroutine which is part of the Data Collector's startup, modifies the code of the Intercept 70 itself at installation, in order to make the Intercept's control block structure self addressable. The Hook Logic code 124 is located in a common memory area called the ECSA 72.

Figure 4:
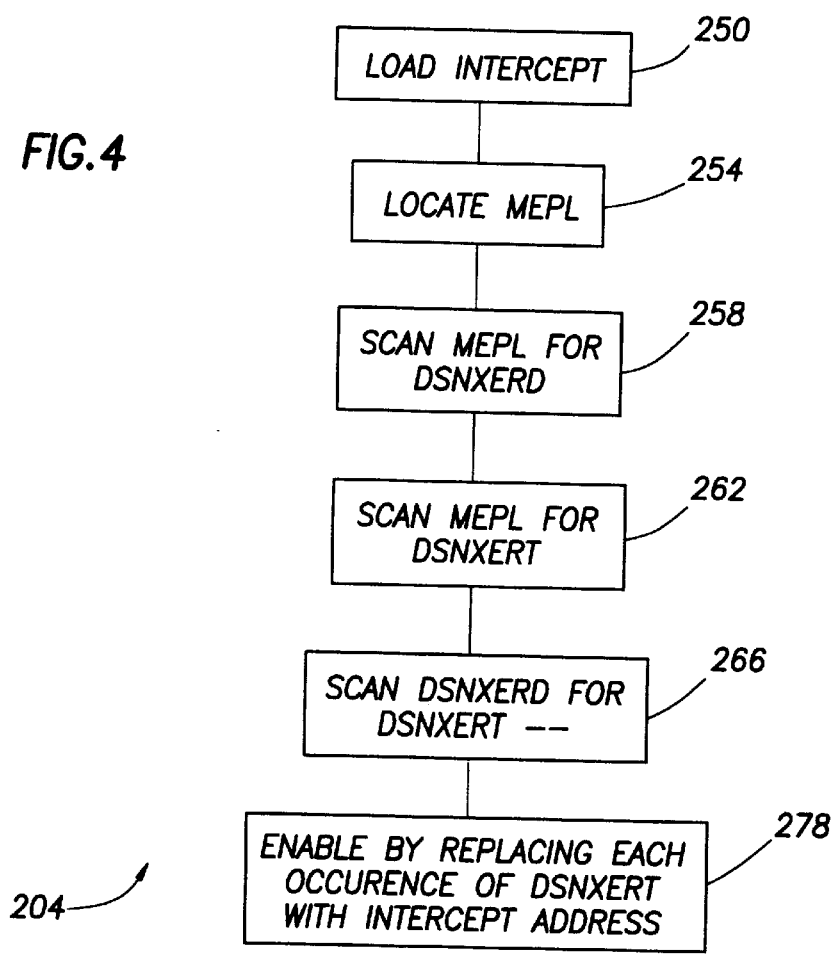
FIG. 4 is a flow chart of the enablement step of the method of the preferred embodiment.

Referring now to FIGS. 1a and 4, step 204, enablement or "hooking" of the Intercept 70, occurs whenever the user 62 or the system administrator (not shown) requests enablement explicitly via an APPTUNE command, and, optionally, each time the Data Collector 66 or DB2 10 starts. The Hook Logic code 124 enables only one copy of the Intercept 70, per MVS image, specific to the release and maintenance levels of DB2 10, per MVS image.

In general terms, enablement 204 involves the verification or generation of any required control blocks by the Hook Logic code 124, the scanning of the MEPL 36, which an arrow 38 indicates, for the entry points/implant points of the DSNXERD 42 and the DSNXERT 46, respectively, and replacement, by compare and swap logic, of the entry point at the implant point with the entry point of the Intercept 70. The DSNXERD 42 and the DSNXERT 46 are located in the DBM1 address space 30.

Referring again to FIG. 3, after enablement, in steps 208–236, the Intercept 70 gathers a first set of data, returns control to the DSNXERT 46, regains control, gathers a second set of data, reduces the data into a summary format, and then returns control to the DSNXERD 42 or to other optional processing. Once enabled, whenever DB2 10 makes a call for the purpose of processing an SQL DML request, the Hook Logic code 124 prevents DB2 10 from calling or branching to the DSNXERT 46, and, instead, DB2 calls or branches to the Intercept 70.

Referring again to FIG. 4, the enablement step 204 is made up of substeps 250–278. In substep 250, the Hook Logic code 124 (shown in FIG. 1a) reads from disk and loads the Intercept 70. In substep 254, the Hook Logic code 124 scans the DB2 address spaces. There are four primary address spaces associated with DB2 10, one of which, named the Master address space 52, includes the MEPL 36. The MEPL 36 is a vector of addresses of entry points, module names, and maintenance levels. The Hook Logic code 124 navigates DB2 control block chains in the Master address space 52 and locates the MEPL 36. In substep 258, the Hook Logic code 124 scans the MEPL 36 for an address of the entry point of the DSNXERD 42. The DSNXERD 42 is important because the DSNXERD is the first routine that DB2 10 calls when DB2 is ready to begin processing an SQL statement 56. Next, in substep 262, the Hook Logic code 124 then scans the MEPL 36 for the address of the entry point of the DSNXERT 46. The DSNXERD 42 calls the DSNXERT 46 whenever DB2 10 begins to process an SQL DML statement.

Without the APPTUNE program installed, DB2 10 would pass control from a series of DB2 routines to the DSNXERD 42. The DSNXERD 42 would then pass control for an SQL DML statement to the DSNXERT 46, and then return to the DSNXERD 42 after DSNXERT processing is complete. However, the Hook Logic code 124 intercepts normal process flow by hooking or enabling the Intercept 70 into the normal process flow (shown in FIGS. 1a and 1b).

Referring again to FIGS. 1a and 3, in substep 266, the Hook Logic code 124 scans the DSNXERD 42 for the entry point of the DSNXERT 46. The above substeps 250–266 are sometimes referred to as an installation step. In substep 278, the Hook Logic code 124 enables the APPTUNE program by replacing each occurrence in the DSNXERD 42 of the entry point of the DSNXERT 46, with the entry point of the Intercept 70.

Figure 1B:
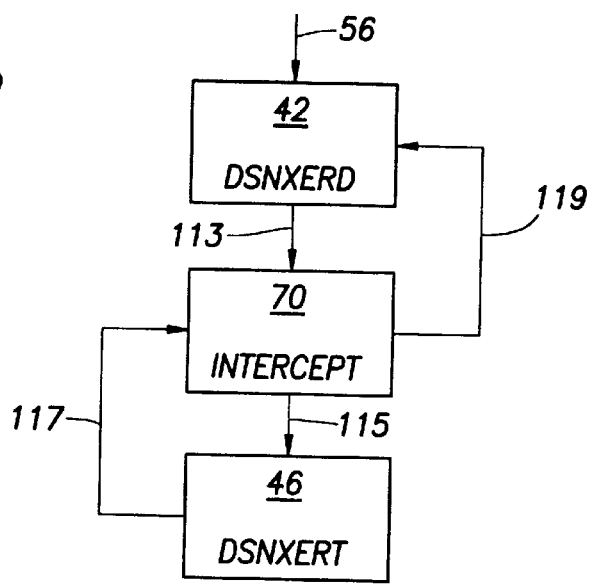
FIG. 1b is a chart showing process flow through the Intercept of the preferred embodiment.
Figure 3:
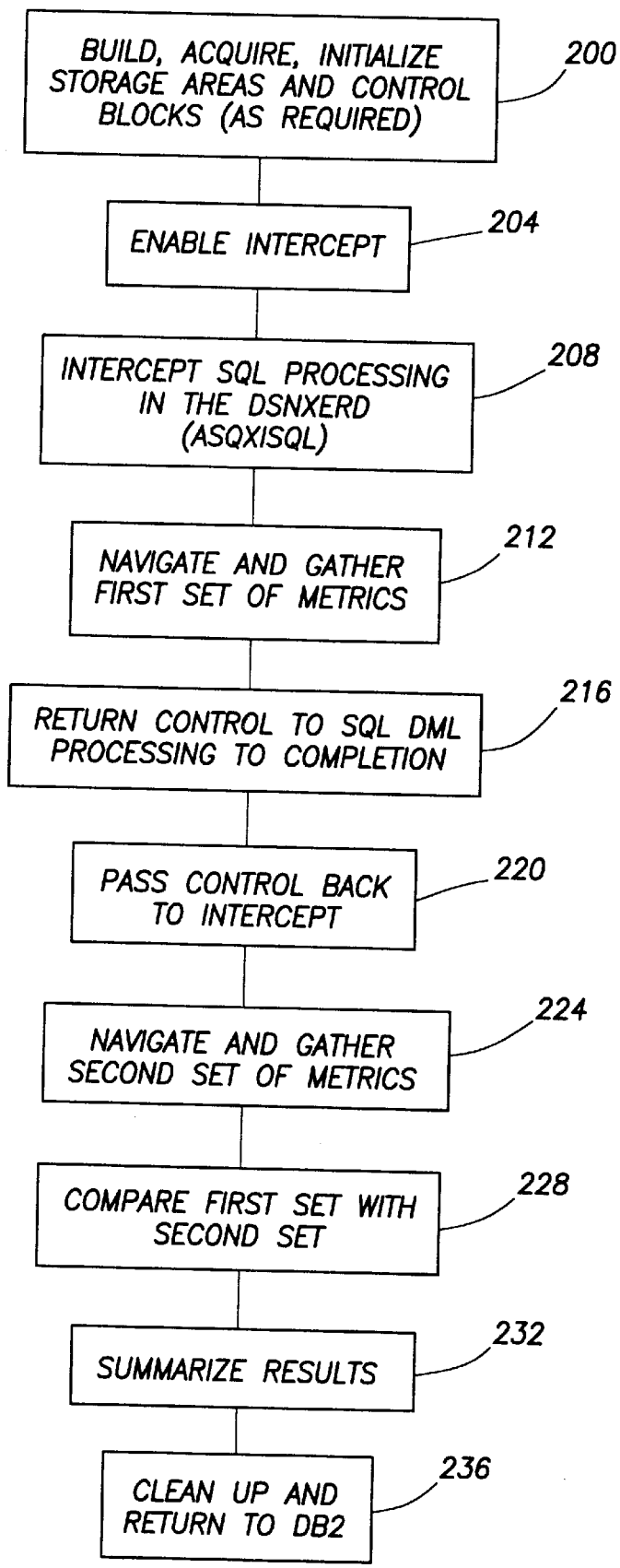
FIG. 3 is a flow chart of the method of the preferred embodiment.

Referring now to FIGS. 1b and 3, in step 200, prior to enablement 204, the Intercept 70 builds, acquires, and initializes storage areas and control blocks (as its operating process requires). After enablement 204, in step 208, the Hook Logic code 124 intercepts SQL processing in the DSNXERD 42, as an arrow 113 indicates. In step 212, the Intercept 70 navigates and gathers a first set of metrics, as an arrow 114 indicates. In step 216, the Intercept 70 returns control to the DSNXERT 46 for processing to completion, as an arrow 115 indicates. In step 220, the DSNXERT 46 passes control back to the Intercept 70, as an arrow 117 indicates. In step 224, the Intercept 70 navigates and gathers a second set of metrics, as the arrow 114 indicates. In step 228, the Intercept 70 compares the first set with the second set of metrics. In step 232, the Intercept 70 summarizes the results of the comparison. In step 236, Intercept 70 cleans up and returns control to the DSNXERD 42, to the line of code immediately after the call to the Intercept (formerly, a call to the DSNXERT 46), or to DB2 10, as an arrow 119 indicates.

Referring again to FIG. 3, in step 212, the Intercept 70 navigates certain control blocks 26 and data structures 28, concurrently obtaining a first series of metrics. The metrics, which the Intercept 70 obtains, include both performance metrics and resource consumption metrics. Examples of control blocks 26 and data structures 28, which the Intercept 70 navigates, include: the WWFR, a counting/statistics control block; the RDA, which stores data about a user program; the QBACKAREA (QBAC), a data structure (DSECT) which contains buffers and input/output information; the QXST, a DSECT which describes data concerning input/output operations and failures; the SQLCA, a DSECT which stores information about SQL errors; the SPA, a control block which stores certain SQL text; the RDI which contains information about the SQL statement being executed; and the WPH (window pool header), a control block which contains input/output information specific to a process.

In step 216, after incrementing a counter in the Intercept 70, the Intercept 70 then passes control back to the DSNXERT 46, allowing the DSNXERT 46 to complete all Data Manipulation Language processing requirements. In step 220, because the Hook Logic code 124 has replaced the entry point of the DSNXERT 46 with the entry point for the Intercept 70, control automatically passes back to the Intercept 70. In step 224, the Intercept 70 then navigates the same control blocks 26 and DSECTs 28, and concurrently obtains a second series of metrics. In step 228, the Intercept 70 compares the first set and the second set of metrics by calculating their difference.

FIG. 5 depicts the substeps of step 232, summarization. In substep 300, the Intercept 70 locates an existing entry in the active reduction table 108 that matches a key value of a then current SQL DML statement. The Intercept 70 keeps track of certain information, such as consumption and resource metrics, counter values, logic flags, and status. The Intercept 70 keeps almost constant track of the counter values, logic flags, and status, as a flow arrow 125 depicts. In substep 304, if any of the certain information does not exist, substep 308 asks whether the active reduction table 108 (shown in FIG. 2) is full. If the active reduction table 108 is not full, then, in substep 310, the Intercept 70 allocates storage and adds a new entry, setting the key values and a value for a current total to zero. Processing then continues to substep 316. In substep 308, if the active reduction table 108 is fill, then, in substep 312, the Intercept 70 allocates a new active reduction table. Processing then returns to the substep 300 above, of locating an existing entry in the active reduction table 108. In substep 316, if the certain information does exist, then, for each metric, the Intercept 70 adds each difference which the comparison step 228 above calculates, to a total, replacing the old difference. The Intercept 70 retains this total as an entry in the active reduction table 108.

In substep 320, at the request of the user 62, the Data Collector 66 extracts the totals from the active reduction table 108, divides the totals by the number of calls made to the particular SQL DML statement type of interest to the user, and presents the user with a visual display showing both a total and an average of performance and resource consumption data which the APPTUNE program associates with the particular SQL DML statement. In substep 324, the Intercept 70 returns control to DB2 10 or other optional processes.

An advantage of the invention is that it gathers performance data concerning the processing of, and resource consumption for, SQL DML statements.

Another advantage of the present invention is that the APPTUNE program consumes only about 20 microseconds of CPU time per SQL statement, substantially less than ten percent (10%) of the total CPU time which DB2 requires to process an SQL statement. Unlike prior art performance measures, this low level of consumption of CPU time enables the APPTUNE program to be run on a continual basis.

Another advantage of the present invention is that it identifies specific SQL DML statements consuming the most resources, thus enabling users 62 to optimize these SQL DML statements.

Another advantage of the present invention is that the APPTUNE program displays SQL DML performance data at the request of the user 62.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed is:

1. A computer-readable medium encoded with a method of intercepting SQL processing within a relational database including a relational database management program, the relational database management program including SQL processing logic, the method comprising the steps of:
   a. enabling an SQL intercept code by connecting directly into the SQL processing logic of the relational database management program;
   b. using the SQL intercept code to intercept an SQL statement made to the relational database;
   c. using the SQL intercept code to collect a first set of real-time SQL performance information located in selected structures;
   d. returning control to the SQL processing logic until the relational database management program has processed the SQL statement to completion;
   e. using the SQL intercept code to collect a second set of real-time SQL performance information located in the selected structures;
   f. comparing the first set with the second set in order to measure the performance of the SQL statement; and
   g. returning control to the relational database management program.

2. The medium of claim 1, wherein the relational database management program is an IBM Database 2 program further including an SQL processing module, an SQL processing routine having an SQL processing entry point and an associated address, and an SQL Data Manipulation Language processing routine having an SQL Data Manipulation Language processing entry point and an associated address, in which the step of enabling comprises the substeps of:
   a. loading a substitute SQL processing routine to the medium;
   b. scanning the relational database management program for the address of the entry point of the SQL processing routine and the address of the entry point of the SQL Data Manipulation Language processing routine;
   c. scanning a portion of the medium, which the SQL processing module occupies, for the address of the entry point of the SQL Data Manipulation Language processing routine; and
   d. replacing the address of the entry point of the SQL Data Manipulation Language processing routine with an entry point address of a substitute SQL Data Manipulation Language processing routine.

3. The medium of claim 1, wherein the IBM Database 2 program further includes an SQL processing module, an SQL processing routine having an associated entry point and address, a Master Entry Point List, and an SQL Data Manipulation Language processing routine have an associated entry point and address, in which the step of enabling comprises the substeps of:
   a. loading a substitute SQL processing routine to the medium;
   b. locating the Master Entry Point List;
   c. scanning the Master Entry Point List for the address of the entry point of the SQL processing routine;
   d. scanning the Master Entry Point List for the address of the entry point of the SQL DML processing routine;
   e. scanning a portion of the medium occupied by the SQL processing routine and locating each occurrence of the entry point address of the SQL DML processing routine; and
   f. for each location matched in step e, replacing the entry point of the SQL Data Manipulation Language processing routine with an entry point of the substitute SQL Data Manipulation Language processing routine.

4. The medium of claim 3, wherein the SQL processing routine is DSNXERD and the SQL DML processing routine is DSNXERT.

5. The medium of claim 1, wherein the selected structures are control blocks and data structures.

6. A computer-readable medium encoded with a method of collecting selected SQL performance information associated with the processing of a current SQL Data Manipulation Language routine statement within a IBM Database 2 program including control blocks, data structures, an SQL processing module, an SQL processing routine having an associated entry point, and an SQL Data Manipulation Language processing routine comprising processing statements and an associated entry point entry point, in which the method comprises the steps of:
   a. building, acquiring, and initializing storage areas and control blocks, as required;
   b. enabling an SQL intercept code by connecting directly into the SQL processing routine of the IBM Database 2 program;
   c. passing control to a substitute SQL Data Manipulation Language processing routine from the IBM Database 2 program at the point at which the IBM Database 2 program begins to process an SQL Data Manipulation Language statement;

d. navigating selected structures in order to obtain a series of metrics, and, concurrently, obtaining a first set of required values from the series of metrics;

e. passing control back to the SQL Data Manipulation Language processing routine;

f. allowing the relational database management system to complete SQL Data Manipulation Language processing requirements;

g. automatically passing control back to the substitute SQL Data Manipulation Language processing routine;

h. navigating the selected structures in order to obtain the series of metrics;

i. obtaining a second set of required values from the series of metrics;

j. comparing the first set and the second set;

k. summarizing the results of the comparing; and l. returning control to the IBM Database 2 program.

7. The medium of claim 6 further utilizing an active reduction table, and, wherein, the current SQL Data Manipulation Language statement includes certain key values, the method comprising the additional step of summarizing the selected SQL performance information which corresponds to the current SQL Data Manipulation Language statement, for later retrieval, the step of summarizing comprising the substeps of:

a. locating an existing entry in the active reduction table that matches a key value of the current SQL Data Manipulation Language statement;

b. keeping track of certain information, such as counter values, logic flags, and status;

c. if any of the certain information does not exist, adding a new entry, setting the key values and a value for a current total to zero;

d. if the active reduction table is full, allocating a new active reduction table and going back to step a;

e. for each metric, adding each difference which the comparing step calculates to a total;

f. retaining the total as an active reduction table entry;

g. incrementing a count of updates for the active reduction table entry; and h. automatically returning control to the IBM Database 2 program.

8. A computerized method of intercepting SQL processing within a relational database including a relational database management program, the relational database management program including SQL processing logic, the method comprising the steps of:

a. enabling an SQL intercept code by connecting directly into the SQL processing logic of the relational database management program;

b. using the SQL intercept code to intercept an SQL statement made to the relational database;

c. using the SQL intercept code to collect a first set of real-time SQL performance information located in selected structures;

d. returning control to the SQL processing logic until the relational database management program has processed the SQL statement to completion;

e. using the SQL intercept code to collect a second set of real-time SQL performance information located in the selected structures;

f. comparing the first set with the second set in order to measure the performance of the SQL statement; and g. returning control to the relational database management program.

9. The method of claim 8, wherein the relational database management program is an IBM Database 2 program further including an SQL processing module, an SQL processing routine having an SQL processing entry point and an associated address, and an SQL Data Manipulation Language processing routine having an SQL Data Manipulation Language processing entry point and an associated address, in which the step of enabling comprises the substeps of:

a. loading a substitute SQL processing routine to the medium;

b. scanning the relational database management program for the address of the entry point of the SQL processing routine and the address of the entry point of the SQL Data Manipulation Language processing routine;

c. scanning a portion of the medium, which the SQL processing module occupies, for the address of the entry point of the SQL Data Manipulation Language processing routine; and d. replacing the address of the entry point of the SQL Data Manipulation Language processing routine with an entry point address of a substitute SQL Data Manipulation Language processing routine.

10. The method of claim 8, wherein the IBM Database 2 program further includes an SQL processing module, an SQL processing routine having an associated entry point and address, a Master Entry Point List, and an SQL Data Manipulation Language processing routine have an associated entry point and address, in which the step of enabling comprises the substeps of:

a. loading a substitute SQL processing routine to the medium;

b. locating the Master Entry Point List;

c. scanning the Master Entry Point List for the address of the entry point of the SQL processing routine;

d. scanning the Master Entry Point List for the address of the entry point of the SQL DML processing routine;

e. scanning a portion of the medium occupied by the SQL processing routine and locating each occurrence of the entry point address of the SQL DML processing routine; and f. for each location matched in step e, replacing the entry point of the SQL Data Manipulation Language processing routine with an entry point of the substitute SQL Data Manipulation Language processing routine.

11. The method of claim 10, wherein the SQL processing routine is DSNXERD, and the SQL DML processing routine is DSNXERT.

12. The method of claim 8, wherein the selected structures are control blocks and data structures of the relational database.

13. A computerized method of collecting selected SQL performance information associated with the processing of a current SQL Data Manipulation Language routine statement within a IBM Database 2 program including control blocks and data structures, an SQL processing module, an SQL processing routine having an associated entry point, and an SQL Data Manipulation Language processing routine comprising processing statements and an associated entry point entry point, in which the method comprises the steps of:

a. building, acquiring, and initializing storage areas and control blocks, as required;

b. enabling an SQL intercept code by connecting directly into the SQL processing routine of the IBM Database 2 program;

c. passing control to a substitute SQL Data Manipulation Language processing routine from the IBM Database 2 program at the point at which the IBM Database 2 program begins to process an SQL Data Manipulation Language statement;

d. navigating selected structures in order to obtain a series of metrics, and, concurrently, obtaining a first set of required values from the series of metrics;

e. passing control back to the SQL Data Manipulation Language processing routine;

f. allowing the relational database management system to complete SQL Data Manipulation Language processing requirements;

g. automatically passing control back to the substitute SQL Data Manipulation Language processing routine;

h. navigating the selected structures in order to obtain the series of metrics;

i. obtaining a second set of required values from the series of metrics;

j. comparing the first set and the second set;

k. summarizing the results of the comparing; and l. returning control to the IBM Database 2 program.

14. The method of claim 13 further utilizing an active reduction table, and, wherein, the current SQL Data Manipulation Language statement includes certain key values, the method comprising the additional step of summarizing the selected SQL performance information which corresponds to the current SQL Data Manipulation Language statement, for later retrieval, the step of summarizing comprising the substeps of:

a. locating an existing entry in the active reduction table that matches a key value of the current SQL Data Manipulation Language statement;

b. keeping track of certain information, such as counter values, logic flags, and status;

c. if any of the certain information does not exist, adding a new entry, setting the key values and a value for a current total to zero;

d. if the active reduction table is full, allocating a new active reduction table and going back to step a;

e. for each metric, adding each difference which the comparing step calculates to a total;

f. retaining the total as an active reduction table entry;

g. incrementing a count of updates for the active reduction table entry; and h. automatically returning control to the IBM Database 2 program.

* * * * *